C. D. SCHMIDT.
ANTISKID DEVICE FOR VEHICLE WHEELS.
APPLICATION FILED NOV. 25, 1918.
1,421,103.
Patented June 27, 1922.
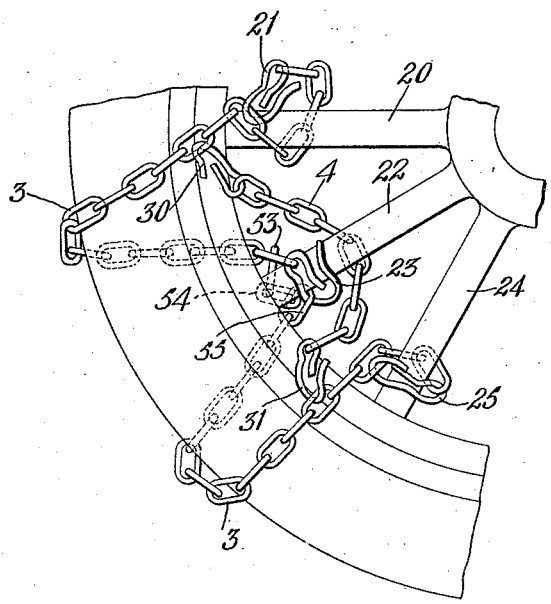
INVENTOR
Charles D. Schmidt
BY
Edwards, Sager & Bower
ATTORNEYS

UNITED STATES PATENT OFFICE.

CHARLES D. SCHMIDT, OF JAMAICA, NEW YORK.

ANTISKID DEVICE FOR VEHICLE WHEELS.

1,421,103. Specification of Letters Patent. Patented June 27, 1922.

Application filed November 25, 1918. Serial No. 264,042.

*To all whom it may concern:*

Be it known that I, CHARLES D. SCHMIDT, a citizen of the United States, residing at Jamaica, in the county of Queens and State of New York, have invented certain new and useful Improvements in Antiskid Devices for Vehicle Wheels, of which the following is a specification.

This invention relates to anti-skid devices for vehicle wheels wherein a flexible member such as a chain is fastened around the tread of the wheel. The object of the invention is to provide such a device that will be readily attached and removed and securely held in place in use.

A further object of the invention is to provide fastening means which will secure the device even when broken and keep it from being thrown off into entanglement with the driving or the running gear.

The accompanying drawing illustrates a specific embodiment of the invention applied to a wheel.

In the specific embodiment of the invention shown in the drawing the chain 3 has one end looped around the spoke 20 and caught by end hook 21 and is then carried around the tread of the tire and passed near spoke 22 at an intermediate portion where it may be provided with the hook 23 engaging a convenient intermediate link to form a permanently positioned loop around this spoke 22 with links 53, 54, 55. The chain 3 is then carried again over the periphery of the tread and looped around spoke 24 by hook 25. There are thus formed three permanent loops around the spokes.

In order to throw the anti-skid chain to the outside of the wheel and away from the mechanism in case of breakage, the chain 4 may be provided attached by hooks 30 and 31 to inside links of a chain as 3 and itself passed outward around an intermediate spoke 22.

It is obvious that other modifications might be made within the principle of the invention which is not confined to the specific devices shown but is intended to cover such variations as fall within the scope of the appended claims.

Having thus described my invention, I declare that what I claim as new and desire to secure by Letters Patent, is:—

1. The combination with a vehicle wheel, of an anti-skid device therefor comprising a single length of chain with a hook at each end and an intermediate tread portion between said hooks, the hook ends of said chain being connected to separate spokes of said wheel and the intermediate portion passing across the tread of said wheel.

2. The combination with a vehicle wheel, of an anti-skid device therefor comprising a single length of chain with a hook at each end and an intermediate tread portion between said hooks, the hook ends of said chain being connected to separate spokes of said wheel and the intermediate portion passing at an angle across the tread of said wheel.

3. An anti-skid device for vehicle wheels comprising a chain with hooks at each end thereof forming loops around separate spokes and having intermediate loops extending across the tread on each side of a spoke intermediate between said first named spokes.

4. An anti-skid device for vehicle wheels comprising a chain with hooks at each end thereof forming loops around separate spokes and having intermediate loops extending across the tread on each side of a spoke intermediate between said first named spokes, said chain having a device connected to it and passing around a spoke to the outside of the wheel so as to throw the chain to the outside of the wheel in case of breakage.

5. The combination with a vehicle wheel, an anti-skid device therefor comprising a single length of chain with a hook at each end and an intermediate tread portion between said hooks, the hook ends of said chain being connected to separate spokes adjacent the felly of the wheel and the intermediate portion passing across the tread of said wheel.

CHARLES D. SCHMIDT.